May 17, 1960   C. D. MacCRACKEN ET AL   2,936,792
FLEXIBLE FOAM-PLASTIC INSULATED DUCT
Filed Oct. 14, 1955
Fig. 1.
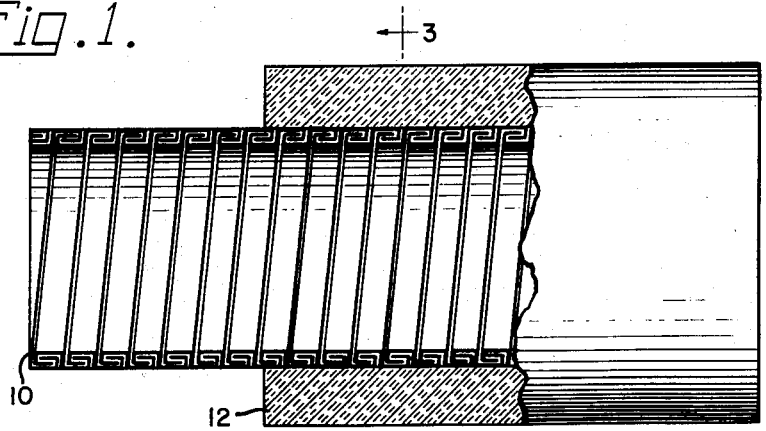
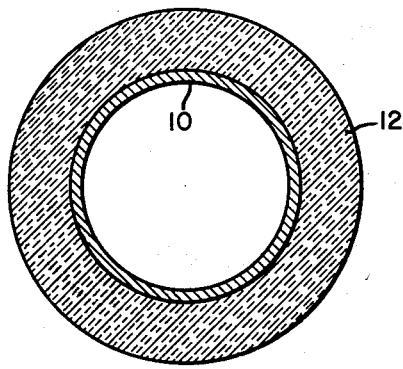
Fig. 3.
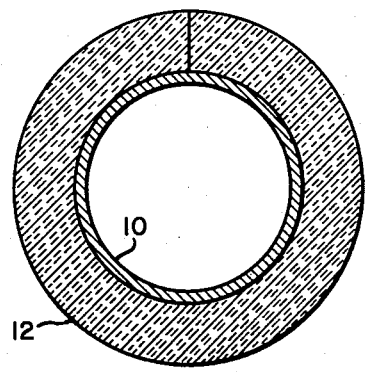
Fig. 4.
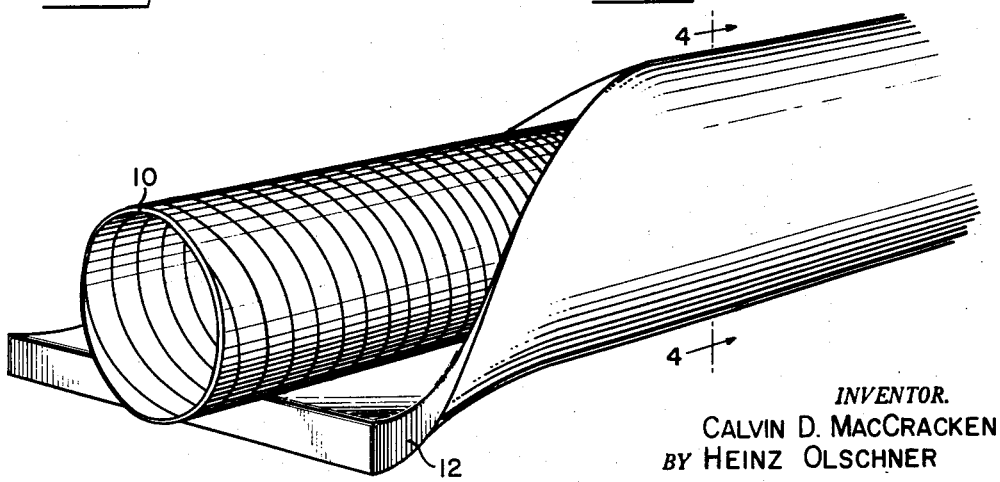
Fig. 2.
*INVENTOR.*
CALVIN D. MacCRACKEN
BY HEINZ OLSCHNER
*James M. Relph.*
ATTORNEY

United States Patent Office 2,936,792
Patented May 17, 1960

2,936,792
FLEXIBLE FOAM-PLASTIC INSULATED DUCT

Calvin D. MacCracken, Tenafly, and Heinz Olschner, Hasbrouck Heights, N.J., assignors to Jet-Heet, Inc., Englewood, N.J., a corporation of New York Application October 14, 1955, Serial No. 540,425

4 Claims. (Cl. 138—58)

This invention relates to improvements in flexible tubing, and particularly to a flexible tube or duct for conveying hot or cold gaseous fluids under pressure or suction. While not necessarily limited thereto, the present invention finds particular application in and will be described with special reference to domestic air conditioning systems, where "air conditioning" is used in its broad sense to include both heating and cooling.

The duct provided by this invention is particularly adapted for use with an air conditioning system in which air is distributed at temperatures substantially higher or lower than the air distribution temperatures commonly encountered in such systems. In such a system, the distributed air is blended at the point of use with a large quantity of air drawn from the space to be air conditioned, and the resulting mixture of moderate temperature is then discharged into the utilization area. Therefore, only a fraction of the normal air volume need be supplied through the duct. As so used, the duct of the present invention replaces the large cross-section, bulky and expensive sheet metal air distribution ducts normally used.

As might be expected, such a duct is required to have unusual characteristics, among which may be listed the following:

(a) It must be capable of conducting air at temperatures as low as 35° F. or as high as 350° F., without deterioration due to moisture accumulation or other effects of widely varying air temperatures, without appreciable temperature increase or decrease along the duct, without any air leakage and in the case of hot air, at a safe outer surface temperature.

(b) It should install readily in restricted area passages, such as wall stud-spaces, without requiring appreciable alteration of the building structure around the installation passage, and without creating any fire hazard or inviting attack by rodents.

(c) It should be flexible to eliminate cutting and fitting of rigid lengths and fixed-angle elbows, yet must maintain its insulation characteristics under combined flexing and compressional stresses.

(d) It must be economical to manufacture, and preferably should be adaptable to mass production techniques.

It is the general object of the present invention to provide an improved flexible duct having the foregoing and other advantageous features.

In conventional insulated flexible tubing structures, it has been common practice prior to the present invention to build the structure up of a series of layers of various materials to obtain the desired result. Thus, in a typical case, such a tube might consist of a rubber or flexible metal core, one or more layers of sealing material such as lacquer or a coated fabric, one or more layers of insulating material such as glass wool, hair-felt, asbestos or the like and an outer covering of a coated fabric, rubber or similar material for holding the fragile insulation in place and protecting it against damage in handling and installation. Aside from the complexity and attendant high fabrication costs of such structures, the conflicting requirements to be met have been only partially obtained on a compromise basis. For one thing, the temperature extremes which the tubing must be able to withstand have limited greatly the selection of materials to be used. Perhaps the most serious difficulty, however, arises from the conflicting requirements of flexibility and consistent insulation characteristics under various conditions of use. If the structure is such that the requisite flexibility is retained, the insulation is likely to shift and be of varying effectiveness from point to point when the tube is flexed. On the other hand, if constructed to preclude shifting or thinning of the insulation, the tube usually is quite inflexible, seriously impairing its useability for the intended purpose.

In accordance with a preferred embodiment of the present invention, the foregoing difficulties are effectively overcome and the above-listed characteristics are fully achieved in a structure wherein a flexible metal core is provided with a single layer covering of so-called foamed isocyanate. The form-retaining characteristics of the metallic core together with those of the foamed isocyanate covering provide a highly flexible structure which does not kink when normally flexed and which will not undergo any appreciable change in insulating characteristics from point to point when the tube is bent, and which incorporates all of the above-mentioned required characteristics in an exceedingly simple structure.

A more complete understanding of the invention, together with further objects, advantages and features thereof will be had from the following description of the present preferred embodiment thereof, when read in connection with the accompanying drawing, in which:

Figure 1 is a plan view, partly in section, of a tube structure embodying the invention;

Figure 2 is a perspective view of a modified form of the tube structure at an intermediate stage of assembly;

Figure 3 is a transverse cross section of the tube shown in Figure 1, on the line 3—3 of Figure 1; and Figure 4 is a similar view of the tube structure shown in Figure 2, taken on the line 4—4 of Figure 2.

Referring to Figure 1, the tube structure of the present invention may comprise a metallic core 10 of the interlocking spiral type. In making metal tubing of this type, which is well known, a long metal strip is formed into a substantially S-shaped cross section, and wound in a spiral upon itself with overlapping of the adjacent turns of the spiral. This forms a continuous tube which is flexible within the dimensional limits of the spacing between adjacent folds of the individual turns.

Over this flexible core is applied a single layer of foamed isocyanate material 12. In general, these materials are based on the reaction product of a polyol or polyester with a diisocyanate. While such foams customarily have been made in the open cell type, such that they have sponge-like characteristics with communication between the adjacent air spaces in the structure, it is possible to make them in closed cell form by the use of blowing agents coupled with heat and pressure, and the latter form is preferred to prevent moisture condensing in the insulating material.

There are a number of different ways in which the foam can be prepared for application over the metallic core. In one instance, as illustrated in Figures 2 and 4, the foam may be formed as an elongated strip which is formed around the core, the edges being brought together and cemented by the use of a suitable cement or softening agent for the plastic material. A synthetic rubber adhesive has been found to be excellent for this purpose. Alternatively, the foam can be sprayed, poured, or extruded on the core, and then cured on the core to form a cellular structure. This will produce the continuous cover shown in Figures 1 and 3. In either case, the end product will comprise a substantially unitary structure in which the foam material comprises an overlaying layer of the order of ½" thick surrounding the metal core, which may have a diameter, for example, of from 1¾" to 2".

One of the outstanding characteristics of a tube structure of this type is its behavior when flexed or bent. Due to the resilience of the foam combined with its essentially homogeneous structure, the material can elongate along the outer circumference of the bend and compact slightly along the inner circumference of the bend without detectable change in the thickness or insulating characteristics of the material. As compared with filamentary or granular materials conventionally used in prior art structures as previously described, this characteristic is extremely important, as it means that the tubing can be installed readily in confined spaces requiring frequent turns in the tubing layout without any damage or loss of the required insulating properties. Furthermore, the tensile strength, compressibility, elasticity and durability of the foam makes it very easy to pull the tubing into position within an enclosed area or through a tight fitting opening without concern about possible damage to the tubing structure. When the tube passes through a constructional fire break, the covering material will not carry combustion through the fire break such as may occur with fabric structures. Also, when the tubing is installed in a building, there is no danger that the insulation material will be consumed or damaged by rodents as has sometimes occurred with fibrous or granular insulation materials previously used which the rodents may carry away for nesting purposes.

There are a number of foamed isocyanates that can be prepared by the reaction of a polyisocyanate with a polyol or polyester compound and used as the covering material in a flexible tubing embodying the invention. One of the best has been found to be polyurethane. The resin, thus prepared, can be reacted with water or additional polyester containing unreacted carboxyl groups to liberate carbon dioxide. This results in further polymerization and cross-linking, with resultant entrapment of the liberated carbon dioxide. As the carbon dioxide is entrapped, it forms the cellular structure which, after curing, is a tough, highly flexible and resilient plastic foam having excellent thermal insulating properties and having the physical characteristics required of flexible duct as set forth above.

When the insulating covering is foamed in situ, or is formed of the required thickness and applied as in Figure 2, a continuous "skin" forms on the surface of the material which serves as a protective covering which, accompanied by the inherent strength of the material, prevents damage during installation and handling. However, if the material is formed in thick blocks and cut to the required thickness for application as in Figure 2, it is preferable to apply a continuous protective coating to stimulate the natural skin normally occurring on the outer surface.

What is claimed is:

1. A flexible thermally insulated duct adapted for carrying conditioned air in air-conditioning systems and having a highly flexible homogeneous insulation layer thereon which has toughness and durability, whereby the duct is adapted to be installed by pulling into enclosed areas and through tight-fitting openings without damage to the insulation layer, and which avoids damage by rodents, and which is adapted to carry air having a temperature in the range from 35° F. to 350° F., said air-conditioning duct comprising a spirally wrapped flexible metal tube, and a tough, highly flexible homogeneous and resilient cellular foam plastic insulation layer surrounding said tube and in contact with said tube, said insulation layer having closed cells with carbon dioxide entrapped therein and having a thickness of the order of ½ of an inch and being the reaction product of a polyurethane and a polyester containing unreacted carboxyl groups.

2. A flexible thermally insulated duct for carrying heated and cooled air in air-conditioning systems having a highly flexible homogeneous insulation layer thereon adapted to be installed by pulling into enclosed areas and through tight-fitting openings without damage to the insulation layer, and which avoids damage by rodents and is adapted to carry air having a temperature throughout the full range from 35° F. to 350° F., said air-conditioning duct comprising a spirally wrapped flexible metal tube having a diameter in the range from 1¾ to 2 inches, and a tough, highly flexible homogeneous and resilient cellular foam plastic insulation layer surrounding and engaging said tube, said insulation layer having closed cells with carbon dioxide entrapped therein and having a thickness of the order of ½ of an inch, being the reaction product of a polyurethane containing an excess of polyisocyanate and water.

3. A flexible thermally insulated duct adapted for use in carrying heated and cooled air in air-conditioning systems, said duct having a highly flexible homogeneous insulation layer thereon which is tough and durable so that the duct can be installed by pulling into enclosed areas and through tight-fitting openings without damage to the insulation layer, and which avoids damage by rodents, said duct being adapted to carry air having a temperature in the range from 35° F. to 350° F. and comprising a spirally wrapped flexible metal tube, and a tough, highly flexible homogeneous and resilient cellular foam plastic insulation layer surrounding said tube and adhering directly to the outside of said tube, said insulation layer having closed cells with carbon dioxide entrapped therein and having a thickness of the order of one-quarter of the diameter of the tube and being the reaction product of a polyurethane and a polyester.

4. A flexible thermally insulated duct for carrying conditioned air in air-conditioning systems, said duct having a highly flexible tough, durable, homogeneous insulation layer thereon, whereby the duct is adapted to be installed by pulling into enclosed areas and through tight-fitting openings without damage to the insulation layer, and which avoids damage by rodents, and which is adapted to carry air having a temperature throughout the range from 35° F. to 350° F., said air-conditioning duct comprising a flexible metal tube of a spirally wrapped interlocked metal strip, and a tough, highly flexible homogeneous and resilient cellular foam plastic insulation layer surrounding said tube, said insulation layer being secured in position on said tube by direct engagement of the insulation layer with the outside of the tube and having closed cells with carbon dioxide entrapped therein being the reaction product of a polyurethane and a polyester containing unreacted carboxyl groups, the resiliency and flexibility of said insulation layer accommodating bending of said duct while maintaining adequate insulation at the bends for operation throughout said temperature range.

References Cited in the file of this patent

UNITED STATES PATENTS

| | | |
|---|---|---|
| 756,140 | Reid et al. | Mar. 29, 1904 |
| 2,044,900 | Debenedetti | June 23, 1936 |
| 2,787,601 | Detrick et al. | Apr. 2, 1957 |
| 2,797,731 | Carlson | July 2, 1957 |

OTHER REFERENCES

"German Plastics Practice," The Murray Printing Co., Cambridge, Mass., copyright 1946. (Copy in Div. 60.)

"Modern Plastics," vol. 32, No. 3, November 1954. (Copy in Div. 50.)

"Modern Plastics," vol. 32, No. 12, August 1955. (Copy in Div. 50.)

"Materials and Methods," August 1955. (Copy in Div. 60.)

"Modern Plastics," vol. 31, No. 8, April 1954. (Copy in Div. 50.)